US 6,719,854 B2

(12) United States Patent
Komori et al.

(10) Patent No.: US 6,719,854 B2
(45) Date of Patent: Apr. 13, 2004

(54) ROLLING BEARING

(75) Inventors: Makoto Komori, Meerbusch (DE);
Yasushi Tamura, Yasugi (JP)

(73) Assignee: Hitachi Metals Ltd., Tokyo (JP)

( * ) Notice: Subject to any disclaimer, the term of this patent is extended or adjusted under 35 U.S.C. 154(b) by 170 days.

(21) Appl. No.: 10/046,707

(22) Filed: Jan. 17, 2002

(65) Prior Publication Data

US 2002/0139454 A1 Oct. 3, 2002

(30) Foreign Application Priority Data

Jan. 22, 2001 (JP) ......................... 2001-013608

(51) Int. Cl.[7] .................. C22C 38/18; C22C 38/24; C22C 38/26
(52) U.S. Cl. ................ 148/325; 148/906; 384/625; 384/912
(58) Field of Search ................ 148/325, 906; 384/912, 625

(56) References Cited

U.S. PATENT DOCUMENTS 5,030,017 A * 7/1991 Murakami et al. .......... 148/325
6,409,846 B1 * 6/2002 Takemura et al. .......... 384/492

FOREIGN PATENT DOCUMENTS

| JP | 61-163244 | 7/1986 |
| JP | 2-294453 | 12/1990 |
| JP | 4-254572 | 9/1992 |
| JP | 9-287053 | 11/1997 |
| JP | 2000-282188 | 10/2000 |

* cited by examiner

Primary Examiner—Deborah Yee
(74) Attorney, Agent, or Firm—Sughrue Mion, PLLC

(57) ABSTRACT

There are provided a rolling bearing comprising an outer race, an inner race, and a plurality of rolling elements each interposed between the outer race and the inner race, at least one of the outer race, the inner race and the rolling elements being made of a steel consisting essentially, by mass, of 0.40 to 0.60% C, not more than 0.5% Si, not more than 0.5% Mn, not less than 8.0% but less than 10.0% Cr, and the balance Fe and incidental impurities, said steel having a hardness not less than 740 HV, carbides contained in said steel having a long size not more than 1.2 μm, and an amount of said carbides being not more than 3.5% in area %, and a method of producing the rolling bearing.

14 Claims, 2 Drawing Sheets

ROLLING BEARING

BACKGROUND OF THE INVENTION

The present invention relates to a rolling device such as a rolling bearing, a direct-acting bearing, a ball screw and a shaft and, more particularly, to a rolling bearing optimal to the application to precision machinery.

Rolling bearings have so far been used in precision machinery and in recent years, they have been used also in machinery relating to computers, such as hard disks, and VTRs. In a rolling bearing of a relatively small size used in these fields, there arises the problem of noise, which has been almost trivial in other uses.

In prior arts, high-carbon chromium steels (JIS-SUJ) or JIS-SUS 440C-class stainless steels have hitherto been used as the material of the rolling bearings. The high-carbon chromium steels (JIS-SUJ) are excellent in quiet (, that is, low noise) but inferior in corrosion resistance, whereas JIS-SUS440C-class stainless steels are excellent in corrosion resistance but inferior in quiet (, that is, noise is in a high level).

On the other hand, the medium-carbon 13%-chromium steel disclosed, for example, in JP-A-61-163244 has been generally used as a steel which has improved the quiet (, that is, the problem of noise) of JIS-SUS440C.

In recent years, however, a very high level of quiet is required in comparison with that of the medium-carbon 13%-chromium as machinery such as a hard disk etc. relating to computers comes to have such a high-capacity design as to have, for example, the number of tracks per inch of not less than 25000, and as the machinery comes to have a high-speed design.

In the rolling bearing disclosed in JP-A-61-163244, the quiet and corrosion resistance were able to be improved, in comparison with the conventional high-carbon chromium steels (JIS-SUJ) and the stainless steel of JIS-SUS440C, by specifying the chemical compositions and the size and amount of eutectic carbides. However, this rolling bearing has not necessarily met the level of higher quiet being required because of recent dramatic enlargement in the environment in which this rolling bearing is used.

SUMMARY OF THE INVENTION

An object of the invention is to provide a rolling bearing indispensable for the enhancement of the performances of VTRs, machinery relating to computers, and precision instruments, which rolling bearing has remarkably-improved quiet (, that is, remarkably low noise) even at a rotational speed not less than 10000 rpm and which rolling bearing has at the same time a corrosion resistance equivalent to that of the conventional rolling bearings.

The present inventors have researched the effect of carbides and hardness affecting the quiet and have found that the quiet can be greatly improved by adopting the following essential features. The inventors have also found a chemical composition desirable for achieving the features and have further established the details such as a manufacturing method such as the method of a heat treatment, whereby the invention is achieved.

According to the first aspect of the invention, there is provided a rolling bearing comprising an outer race, an inner race, and a plurality of rolling elements interposed between the outer race and the inner race, at least one of the outer race, the inner race and the rolling elements being made of a steel consisting essentially, by mass, of 0.40 to 0.60% C, not more than 0.5% Si, not more than 0.5% Mn, not less than 8.0% but less than 10.0% Cr, and the balance Fe and incidental impurities, said steel having a hardness not less than 740 HV, carbides contained in said steel having a long size not more than 1.2 µm, and an amount of said carbides being not more than 3.5% in area %. Preferably, the carbides contained in this steel have a ratio of (a short size)/(a long size) of 0.9 to 1.0 and an amount not less than 0.5% in area %.

In the steel, it is preferred that the steel consists essentially, by mass, of 0.40 to 0.60% C, 0.1 to 0.5% Si, 0.1 to 0.5% Mn, not less than 8.0% but less than 10.0% Cr, and the balance Fe and incidental impurities. It is also preferred that the steel further contains, by mass, at least one kind selected from the group consisting of W and Mo the total amount of which at least one kind is in the range of 0.1 to 2.0% in terms of (½W+Mo), and/or at least one kinds selected from the group consisting of Nb and V the total amount of which at least one kind is in the range of 0.05 to 0.50% in terms of (½Nb+V). In addition, it is further preferred that the steel contain, by mass, less than 0.05% N, not more than 0.01% Al, and not more than 50 ppm of O (oxygen).

According to the second aspect of the invention there is provided a method of making a rolling bearing comprising an outer race, an inner race, and a plurality of rolling elements interposed between the outer race and the inner race, the method comprising the steps of: preparing a steel material consisting essentially, by mass, of 0.40 to 0.60% C, not more than 0.5% Si, not more than 0.5% Mn, not less than 8.0% but less than 10.0% Cr, and the balance Fe and incidental impurities; and heat-treating the steel by performing a hardening treatment at a hardening temperature not less than 1000° C., a sub-zero treatment at a sub-zero treatment temperature not more than −70° C., and a tempering at a tempering temperature of 150 to 200° C., so that at least one of the outer race, the inner race and the rolling elements is made. For the steel material, as a matter of course, it is possible to use also the preferred chemical compositions disclosed regarding the preferred steels. Further, it is preferred that the steel material be produced by a remelting process or a continuous casting process and that, more specifically, the steel material be obtained by performing the cold drawing thereof with a reduction of area of not less than 15%.

DESCRPTION OF THE PREFERRED EMBODIMENTS

Figure 1:
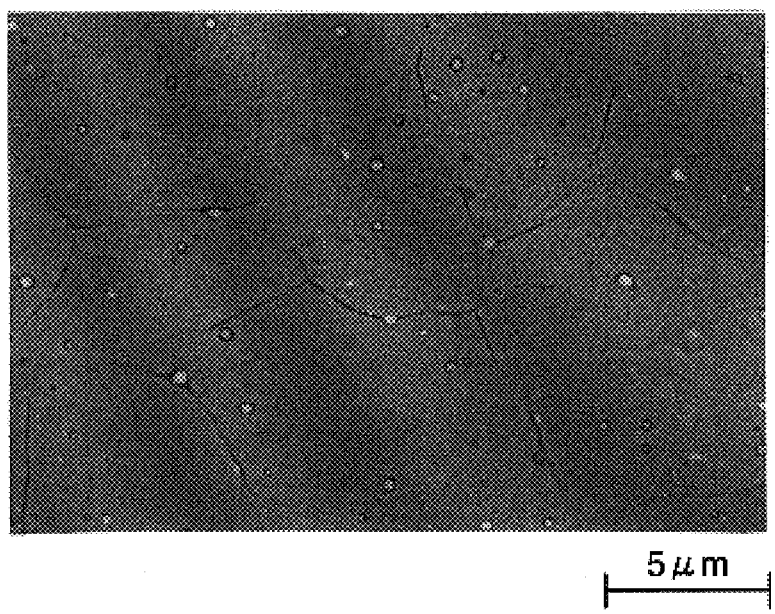
FIG. 1 is the microstructure of a steel material of which a rolling bearing of the invention is made.

The size of the carbides of the rolling bearing of the invention and the reasons for the numerical limitation of the size are described below.

In the above medium-carbon 13% chromium steel disclosed in JP-A-61-163244, its quiet was improved in comparison with the conventional steels by limiting the size and amount of eutectic carbides that are formed by a eutectic reaction during the solidification of the molten steel.

However, in the invention, in order to meet the requirements for the higher levels of quiet, the size and amount of undissolved carbides after the heat treatment are limited, which is a remarkable feature of the invention.

In the making of a rolling bearing, it is a general practice to first obtain a rough shape by the plastic working etc. of a steel in an annealed state and to perform the heat treatment and the finish working after that. In this practice, however, a part of the carbides that had existed in an annealed state after the heat treatment is not dissolved in a solid solution state and remains. These undissolved carbides are beneficial because they suppress the grain growth during heat treatment, thereby bringing about strength and toughness to a rolling bearing at the same time and further imparting wear resistance to the rolling bearing. However, in a case where coarse carbides comes to be present on the track surfaces of the races of the bearing or on the surfaces of the rolling elements, it is difficult to obtain a proper shape of finished surface due to a difference in machinability between the carbides and the surrounding matrix, so that the quiet thereof is deteriorated.

Thus, it is necessary to reduce the size of carbides as small as possible. Therefore, in the invention, the size of carbides is limited to have a long size not more than 1.2 $\mu$m and preferably not more than 0.8 $\mu$m. Furthermore, in order to prevent submicroscopic projections and depressions from occurring in a certain direction after the polishing, it is preferred that the ratio of (the short size)/(the long size) of the carbides be in the range of 0.9 to 1.0.

As regards the carbides dispersed in the structure of a bearing, it is performed in the conventional technique that eutectic carbides crystallized from molten steel in the solidification process during the steel-making are controlled, whereas in the invention, carbides precipitated during the annealing are mainly controlled, so that the above-explained morphology of the carbides can be easily achieved.

The size of carbides is limited for the above reason. In addition, in order to lower the possibility of occurrence of coarse carbides on the track surface etc., it is also necessary to limit the absolute amount of the carbides. In the invention, the amount of the carbides is not more than 3.5% in terms of area percent and preferably not more than 2.5%. Further, in the invention, to ensure wear resistance appropriate for a bearing and to prevent all of the polishablility, corrosion resistance and fatigue characteristics from being deteriorated, the area percent of the carbides may be not less than 0.5% and the short size of the carbides may be not less than 0.2 $\mu$m.

Next, the reason for the limitation of the hardness is described.

In principle, a high level of hardness is necessary for ensuring the endurance of a bearing. When the hardness is low, the matrix is damaged during a finish working and it becomes difficult to obtain an appropriate shape of a finished surface, resulting in the deterioration of the quiet. In the invention, therefore, the hardness of the steel is limited to be not less than 740 HV and preferably not less than 760 HV. Incidentally, it is unnecessary to limit the upper limit of the hardness, however, in view of the hardness of abrasive grains used for the polishing, the upper limit thereof should be taken into consideration. For example, in a case where abrasive grains used for the polishing have a hardness level not less than 1500 HV, the hardness of the bearings made of these steel materials does not exceed 1000 HV and the upper limit thereof is determined in taking the ease of the manufacture thereof into consideration.

Next, the reason why the chemical compositions of the material are limited is described.

C (carbon) is an element which is essential for imparting the hardness to the material. For this purpose, a C content not less than 0.40% is required. However, when the C content is too high, the amount of coarse carbides increase, so that the quiet, machinability and corrosion resistance thereof are deteriorated. Therefore, the C content is not more than 0.60%.

Si is effective in increasing the wear resistance and an Si content not less than 0.1% is desirable. However, an excessive Si content causes work hardening, deteriorating the machinability. Therefore, the upper limit of the Si content is 0.5%.

Mn is effective in improving the hardenability and an Mn content not less than 0.1% is desirable. However, an excessive Mn content increases the amount of retained austenite, lowering the heat-treatment hardness. For this reason, the Mn content is not more than 0.5%.

Cr exists in the matrix in a solid solution state and increases the corrosion resistance. For this purpose, a Cr content not less than 8.0% is required. A part of Cr combines with C to form the undissolved carbides after the heat treatment. However, when the Cr content is too high, the amount of coarse carbides increase and the heat-treatment hardness decreases. Therefore, in taking into consideration the relation between the Cr content and the C content, the Cr content is less than 10.0%.

In order to improve the wear resistance, either one or both of W and Mo may be added in the total amount of not less than 0.1% in terms of (½ W+Mo). However, an excessive amount thereof does not brings about an increase in the effect and the cost increases. Therefore, when either one or both of these elements are added, the content is not more than 2.0%.

In order to improve the wear resistance and to make the grains fine in size, either one or both of Nb and V may be added in the total amount of not less than 0.05% in terms of (½ Nb+V). However, when the content is too high, coarse carbides come to be present, so that the quiet and machinability thereof are deteriorated. Therefore, when either one or both of these elements are added, the total content is not more than 0.50%.

N (nitrogen) acts to combine with alloying elements added to the steel to thereby generate hard nitrides, and acts to be dissolved in the carbides to thereby increase the hardness of the carbides. In this case, it becomes difficult to obtain a satisfactorily finished face-and-shape due to a difference in machinability between the nitrides and carbides containing the dissolved nitrogen and the matrix, so that the quiet is deteriorated. Therefore, it is preferred that the N content be less than 0.05%.

Further, because Al-based oxides contained in steel shorten the fatigue life of a rolling bearing, it is preferred that the Al content be not more than 0.01% and that the O content be not more than 50 ppm.

Regarding Al (aluminum), the Al-based oxides contained in the steel deteriorates the service life of the rolling bearing. Thus, it is preferred that the amount of Al is limited to be not more than 0.01% and that the amount of O (oxygen) is limited to be not more than 50 ppm.

The effect of the invention can be obtained when at least one of the outer race, the inner race and the rolling elements that constitute the rolling bearing is made of the above steel relating to the invention. For example, the above steel relating to the invention may be used to make the rolling elements, while using, to make the outer race and the inner race, any one of the high-carbon chromium steel (JIS-SUJ), the stainless steel of JIS-SUS440C-classm, and the conventionally used-and-proposed steel such as the above-explained medium-carbon 13% chromium steel. The steel relating to the invention may be also used in another combination other than that of the above case. In the invention, it is preferred that each of the outer race, the inner race and the rolling elements is made of the above steel found in the invention.

Next, a method of making the rolling bearing of the invention is described.

In the case of the rolling bearing of the invention, the effect of the invention can be obtained when at lest one of the outer race, the inner race and the rolling elements that constitute the rolling bearing is made of the above steel relating to the invention. In this case, the morphology of the carbides contained in the steel used for making the member is important, and, for realizing the morphology, a preferred chemical composition and a manufacturing process, in particular, a heat treatment step become important.

More specifically, in the steels of which each of the members relating to the invention is made, it is particularly important to establish means capable of suppressing coarse, undissolved carbides which remain after the heat treatment of the steels. The present inventors found a technique effective in achieving this by intensively researching heat treatment conditions matched to the above chemical compositions. Specifically, the steel material having the chemical composition disclosed above is subjected to a heat treatment by performing the hardening at a hardening temperature of not less than 1000° C., the sub-zero treatment at a sub-zero treatment temperature of not more than −70° C., and the tempering at a tempering temperature of 150 to 200° C., whereby at least one of said outer race, the inner race and the rolling elements is made.

First, in order to obtain the hardness and the corrosion resistance necessary for the rolling bearing of the invention, the hardening temperature is limited to be not less than 1000° C. and preferably above 1020° C. However, because the toughness decreases when grains become too large in size and because the corrosion resistance decreases when carbides are precipitated at grain boundaries during the hardening and cooling steps, it is preferred that the hardening temperature be not more than 1070° C. What is important is the sub-zero treatment following the cooling performed at the hardening temperature, and by controlling this treatment temperature to not more than −70° C., the occurrence of the retained austenite is suppressed as little as possible. As regards the temperature of the tempering performed after that, a temperature range of 150 to 200° C. is adopted in order to ensure the thermal stability during use.

As regards a steel material to be used, inclusions, which are oxides, as well as coarse carbide also deteriorate the quiet, and hence it is preferred that these inclusions be suppressed as small as possible in number and amount. Therefore, in the case of the invention, it is preferred that the steel material be produced by a remelting process, such as VAR (vacuum arc remelting) and ESR (electroslag remelting), or a continuous casting process.

When making the members of the bearing, it is a usual practice to first obtain a rough shape by the plastic working etc. of the steel having an annealed state and then to perform the heat treatment and the finish working after that. As the steel material that is subjected to the heat treatment, it is preferred that the steel material has a cold-worked state that enables the grains and the carbides thereof to further become fine in size during the heat treatment. For this reason, it is preferred that the steel material be further plastic-worked by a cold drawing with a reduction of area of not less than 15%. For instance, a steel material obtained by a cold drawing with a reduction of area of not less than 15% is annealed at an annealing temperature of 750 to 880° C., the annealed steel being then worked into a rough shape and subjected to a heat treatment and a finish working.

The specific embodiments of the invention are described below in detail.

TABLE 1 shows the chemical compositions of the steel materials of rolling bearings of the invention and comparative examples, which were obtained from ingots of steels produced by ESR. In the table, sample No. 10 indicates the material of the conventional rolling bearing explained in connection with JP-A-61-163244.

TABLE 1

| | chemical composition (mass %) | | | | | | | | | | *O (ppm) | | |
|---|---|---|---|---|---|---|---|---|---|---|---|---|---|
| No. | C | Si | Mn | Cr | W | Mo | Nb | V | Al | N | O | Fe | Kind |
| 1 | 0.50 | 0.13 | 0.22 | 9.52 | <0.01 | <0.01 | <0.01 | <0.01 | 0.008 | 0.03 | 38 | the balance | The Invention |
| 2 | 0.58 | 0.12 | 0.21 | 8.21 | <0.01 | 1.79 | <0.01 | <0.01 | 0.009 | 0.04 | 41 | the balance | The Invention |
| 3 | 0.54 | 0.11 | 0.27 | 9.21 | 0.15 | 0.44 | 0.05 | <0.01 | 0.010 | 0.04 | 9 | the balance | The Invention |
| 4 | 0.50 | 0.08 | 0.24 | 9.20 | <0.01 | 0.25 | <0.01 | 0.12 | 0.007 | 0.04 | 18 | the balance | The Invention |
| 5 | 0.39 | 0.10 | 0.25 | 9.18 | <0.01 | 0.33 | <0.01 | <0.01 | 0.012 | 0.25 | 7 | the balance | Comparative Sample |
| 6 | 0.62 | 0.13 | 0.23 | 9.19 | <0.01 | 0.29 | <0.01 | <0.01 | 0.013 | 0.04 | 4 | the balance | Comparative Sample |
| 7 | 0.51 | 0.11 | 0.24 | 7.96 | <0.01 | 0.45 | <0.01 | <0.01 | 0.022 | 0.04 | 11 | the balance | Comparative Sample |
| 8 | 0.52 | 0.12 | 0.22 | 10.00 | <0.01 | 0.13 | <0.01 | <0.01 | 0.010 | 0.03 | 9 | the balance | Comparative Sample |
| 9 | 0.42 | 0.12 | 0.24 | 8.25 | <0.01 | 0.93 | 0.05 | 0.50 | 0.008 | 0.02 | 25 | the balance | Comparative Sample |
| 10 | 0.68 | 0.30 | 0.75 | 13.21 | <0.01 | <0.01 | <0.01 | <0.01 | 0.023 | 0.04 | 9 | the balance | Comparative Sample |

Figure 3:
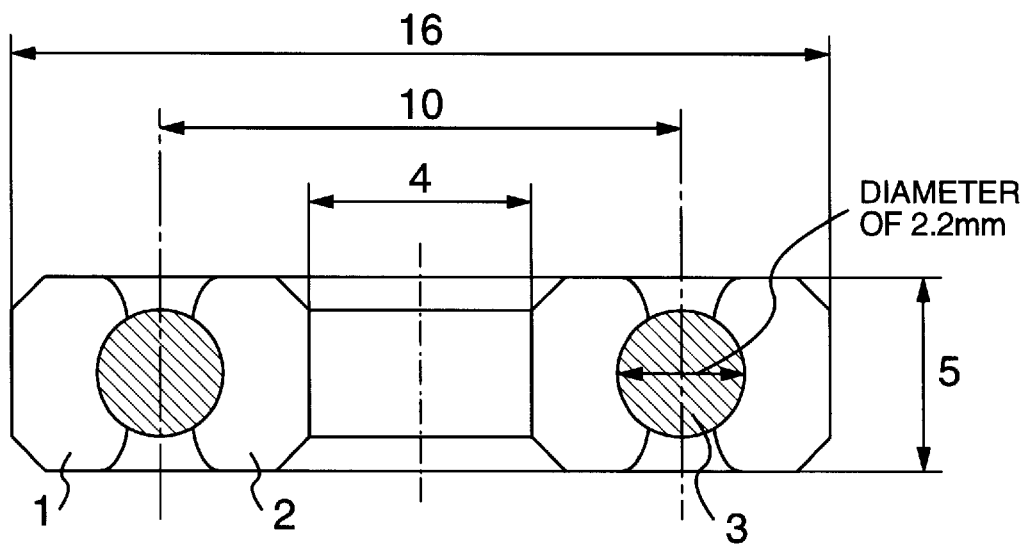
FIG. 3 is an enlarged, schematic sectional view of an example of the rolling bearing embodying the invention.

Next, the material steel ingots for the rolling bearings of the invention and comparative examples were forged and rolled to hot-rolled steel bars, which were then finished to wire rods having a cross section of 20 mm×20 mm by a cold drawing with a reduction of area of 20% and were then subjected to a heat treatment after an annealing at 750 to 880° C. TABLE 2 shows the hardness and state of carbides after the heat treatment. The heat treatment conditions were as follows: the hardening was performed by cooling with a gas of 5 bar in pressure after the holding at 1050° C. for 30 minutes; the sub-zero treatment was performed by holding at −80° C. for 60 minutes; and the tempering was performed by holding at 160° C. for 90 minutes and then by air-cooling the steel materials. In the measurement of the carbides, an area of 4000 μm² for each of the steel materials was observed by use of a scanning electron microscope of a magnification of 4000 times to thereby measure the maximum particle size, the ratio of (the short size) to (the long size), and the area percent of the carbides.

ball bearings were fabricated from the above wire rods while adopting the same heat treated under as that described above. In the ball bearing having the dimensions (unit: mm) shown in FIG. 3, a plurality of balls 3 are interposed between outer races 1 and inner races 2 as shown in the drawing. In this case, the outer races 1, the inner races 2 and the balls 3 are made of a steel of the same chemical composition. TABLE 2 also shows the comparison of these properties.

As is apparent from TABLE 2, the bearings of the invention have a corrosion resistance equivalent to that of the conventional rolling bearing No. 10 although their wear resistance is somewhat inferior. The quiet of the bearings of the invention is remarkably improved in comparison with the conventional rolling bearing No. 10. As shown in FIGS.

TABLE 2

| No. | hardness (HV) | carbide long size (μm) | (short size)/ (long size) | area (%) | Wear amount (mm³/mm²/mm) | corrosion resistance | quiet | kind |
| --- | --- | --- | --- | --- | --- | --- | --- | --- |
| 1 | 742 | 0.83 | 0.95 | 3.2 | 1.5 | ◯ | 2.0 | The Invention |
| 2 | 775 | 0.95 | 0.97 | 2.5 | 1.6 | ◯ | 2.0 | The Invention |
| 3 | 765 | 1.02 | 0.91 | 2.7 | 1.5 | ◯ | 1.9 | The Invention |
| 4 | 772 | 0.78 | 0.96 | 2.3 | 1.7 | ◯ | 2.1 | The Invention |
| 5 | 726 | 0.75 | 0.96 | 1.6 | 2.1 | ◯ | 1.4 | Comparative Sample |
| 6 | 755 | 1.13 | 0.85 | 6.5 | 1.4 | × | 1.0 | Comparative Sample |
| 7 | 762 | 0.76 | 0.93 | 2.1 | 1.9 | Δ | 1.5 | Comparative Sample |
| 8 | 738 | 1.95 | 0.88 | 3.6 | 1.5 | ◯ | 1.0 | Comparative Sample |
| 9 | 712 | 2.36 | 0.91 | 5.3 | 1.4 | × | 1.1 | Comparative Sample |
| 10 | 751 | 2.15 | 0.54 | 6.7 | 1.4 | ◯ | 1.0 | Comparative Sample |

Figure 2:
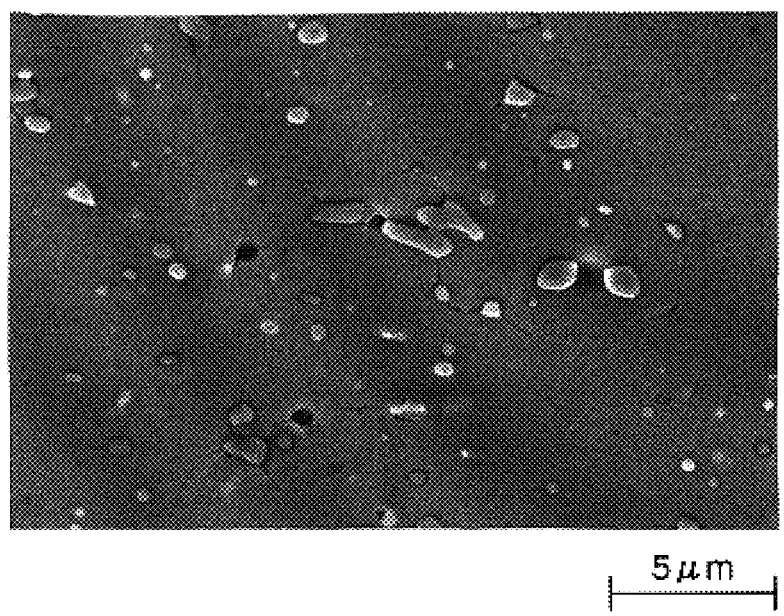
FIG. 2 is the microstructure of another steel material of which a conventional rolling bearing is made.

FIG. 1 shows the microstructure (4000 times) of the steel material after the above heat treatment which material was used to produce the rolling bearing No. 4 of the invention, and FIG. 2 shows the microstructure (4000 times) of the steel material after the above heat treatment which material was used to produce the rolling bearing No. 10 of the conventional example. As is apparent from FIG. 1, the steel material for the rolling bearing of the invention has a dense structure in which no coarse carbides are present, whereas the steel material for the conventional rolling bearing contains such coarse carbides as the size thereof exceeds 2 μm, as shown in FIG. 2.

The wear resistance and the corrosion resistance of these materials were evaluated after the heat treatment. The wear resistance was evaluated by the Ohgoshi type wear test, in which the mating material was the stainless steel of JIS-SUS 440C (having a hardness of 60 HRC), the friction distance being 400 m, the final load being 67 N, and the friction rate was 1.96 m/s. Corrosion resistance was evaluated by performing a salt spray test in accordance with JIS-Z2371 for 10 hours and the rusting state was visually judged. In TABLE 2, the mark "X" represents a case where rusting occurred on all of the surface, "Δ" representing another case where spot-rusting occurred with each of large spots having a size not less than 1 mm, and "O" represents still another case where spot-rusting occurred with small spots.

The quiet was evaluated by use of the rolling bearings at a rotation speed of 1000 rpm and was expressed by such an index as the quite of the sample No. 10 is standardized to have an index of 1. The larger the numerical value of the index, the better the quiet becomes. As the rolling bearings, 1 and 2, the steel materials for the rolling bearings of the invention have a dense structure in which there is present no coarse carbides, whereas the steel material for the conventional rolling bearing contains coarse carbides, which are supposed to cause the deterioration of the quiet. Accordingly, it is apparent that the rolling bearings of the invention have excellent properties.

According to the invention, it is possible to make the rolling bearings which can provide remarkably improved quiet and, at the same time, have corrosion resistance equivalent to that of conventional bearings, and the invention provides a technique indispensable for the improvement of the performances of VTRs, the machinery relating to computers, and precision instruments.

What is claimed is:

1. A rolling bearing comprising an outer race, an inner race, and a plurality of rolling elements each interposed between the outer race and the inner race, at least one of the outer race, the inner race and the rolling elements being made of a steel consisting essentially, by mass, of 0.40 to 0.60% C, not more than 0.5% Si, not more than 0.5% Mn, not less than 8.0% but less than 10.0% Cr, and the balance Fe and incidental impurities, said steel having a hardness not less than 740 HV, carbides contained in said steel having a long size not more than 1.2 μm, and an amount of said carbides being not more than 3.5% in area %.

2. A rolling bearing as set forth in claim 1, said steel consisting essentially, by mass, of 0.40 to 0.60% C, not less than 0.1% but not more than 0.5% Si, not less than 0.1% but not more than 0.5% Mn, not less than 8.0% but less than 10.0% Cr, and the balance Fe and incidental impurities.

3. A rolling bearing comprising an outer race, an inner race, and a plurality of rolling elements each interposed between the outer race and the inner race, at least one of the outer race, the inner race and the rolling elements being made of a steel consisting essentially, by mass, of 0.40 to 0.60% C, not more than 0.5% Si, not more than 0.5% Mn, not less than 8.0% but less than 10.0% Cr, at least one kind selected from the group consisting of W and Mo the total amount of which at least one kind is in the range of 0.1 to 2.0% in terms of (½W+Mo), and the balance Fe and incidental impurities, said steel having a hardness not less than 740 HV, carbides contained in said steel having a long size not more than 1.2 μm, and an amount of said carbides being not more than 3.5% in area %.

4. A rolling bearing as set forth in claim 3, said steel consisting essentially, by mass, of 0.40 to 0.60% C, not less than 0.1% but not more than 0.5% Si, not less than 0.1% but not more than 0.5% Mn, not less than 8.0% but less than 10.0% Cr, at least one kind selected from the group consisting of W and Mo the total amount of which at least one kind is in the range of 0.1 to 2.0% in terms of (½W+Mo), and the balance Fe and incidental impurities.

5. A rolling bearing comprising an outer race, an inner race, and a plurality of rolling elements each interposed between the outer race and the inner race, at least one of the outer race, the inner race and the rolling elements being made of a steel consisting essentially, by mass, of 0.40 to 0.60% C, not more than 0.5% Si, not more than 0.5% Mn, not less than 8.0% but less than 10.0% Cr, at least one kind selected from the group consisting of Nb and V the total amount of which at least one kind is in the range of 0.05 to 0.50% in terms of (½Nb+V), and the balance Fe and incidental impurities, said steel having a hardness not less than 740 HV, carbides contained in said steel having a long size not more than 1.2 μm, and an amount of said carbides being not more than 3.5% in area %.

6. A rolling bearing as set forth in claim 5, said steel consisting essentially, by mass, of 0.40 to 0.60% C, not less than 0.1% but not more than 0.5% Si, not less than 0.1% but not more than 0.5% Mn, not less than 8.0% but less than 10.0% Cr, at least one kind selected from the group consisting of Nb and V the total amount of which at least one kind is in the range of 0.05 to 0.50% in terms of (½Nb+V), and the balance Fe and incidental impurities.

7. A rolling bearing comprising an outer race, an inner race, and a plurality of rolling elements each interposed between the outer race and the inner race, at least one of the outer race, the inner race and the rolling elements being made of a steel consisting essentially, by mass, of 0.40 to 0.60% C, not more than 0.5% Si, not more than 0.5% Mn, not less than 8.0% but less than 10.0% Cr, at least one kind selected from the group consisting of W and Mo the total amount of which at least one kind is in the range of 0.1 to 2.0% in terms of (½W+Mo), at least one kind selected from the group consisting of Nb and V the total amount of which at least one kind is in the range of 0.05 to 0.50% in terms of (½Nb+V), and the balance Fe and incidental impurities, said steel having a hardness not less than 740 HV, carbides contained in said steel having a long size not more than 1.2 μm, and an amount of said carbides being not more than 3.5% in area %.

8. A rolling bearing as set forth in claim 7, said steel consisting essentially, by mass, of 0.40 to 0.60% C, not less than 0.1% but not more than 0.5% Si, not less than 0.1% but not more than 0.5% Mn, not less than 8.0% but less than 10.0% Cr, at least one kind selected from the group consisting of W and Mo the total amount of which at least one kind is in the range of 0.1 to 2.0% in terms of (½W+Mo), at least one kind selected from the group consisting of Nb and V the total amount of which at least one kind is in the range of 0.05 to 0.50% in terms of (½Nb+V), and the balance Fe and incidental impurities.

9. A rolling bearing comprising an outer race, an inner race, and a plurality of rolling elements each interposed between the outer race and the inner race, at least one of the outer race, the inner race and the rolling elements being made of a steel consisting essentially, by mass, of 0.40 to 0.60% C, not more than 0.5% Si, not more than 0.5% Mn, not less than 8.0% but less than 10.0% Cr, at least one kind selected from the group consisting of W and Mo the total amount of which at least one kind is in the range of 0.1 to 2.0% in terms of (½W+Mo), at least one kind selected from the group consisting of Nb and V the total amount of which at least one kind is in the range of 0.05 to 0.50% in terms of (½Nb+V), less than 0.05% N, not more than 0.01% Al, not more than 50 ppm O (, that is, oxygen), and the balance Fe and incidental impurities, said steel having a hardness not less than 740 HV, carbides contained in said steel having a long size not more than 1.2 μm, and an amount of said carbides being not more than 3.5% in area %.

10. A rolling bearing as set forth in claim 9, said steel consisting essentially, by mass, of 0.40 to 0.60% C, not less than 0.1% but not more than 0.5% Si, not less than 0.1% but not more than 0.5% Mn, not less than 8.0% but less than 10.0% Cr, at least one kind selected from the group consisting of W and Mo the total amount of which at least one kind is in the range of 0.1 to 2.0% in terms of (½W+Mo), at least one kind selected from the group consisting of Nb and V the total amount of which at least one kind is in the range of 0.05 to 0.50% in terms of (½Nb+V), less than 0.05% N, not more than 0.01% Al, not more than 50 ppm O (, that is, oxygen) and the balance Fe and incidental impurities.

11. A rolling bearing as set forth in claim 1, each of said carbide having a ratio of (a short size)/(a long size) which ratio is in a range of 0.9 to 1.0.

12. A rolling bearing as set forth in claim 10, each of said carbide having a ratio of (a short size)/(a long size) which ratio is in a range of 0.9 to 1.0.

13. A rolling bearing as set forth in claim 1, an area percent of said carbides being not less than 0.5%.

14. A rolling bearing as set forth in claim 10, an area percent of said carbides being not less than 0.5%.

* * * * *